(12) United States Patent
Loeffelholz et al.

(10) Patent No.: US 9,104,005 B2
(45) Date of Patent: Aug. 11, 2015

(54) CABLE SHROUD ASSEMBLY FOR FIBER OPTIC ENCLOSURE

(75) Inventors: Todd Loeffelholz, Minnetonka, MN (US); Mao Nian Tang, Su Qian (CN)

(73) Assignee: ADC Telecommunications, Inc., Berwyn, PA (US)

( * ) Notice: Subject to any disclaimer, the term of this patent is extended or adjusted under 35 U.S.C. 154(b) by 217 days.

(21) Appl. No.: 13/976,275

(22) PCT Filed: Dec. 31, 2010

(86) PCT No.: PCT/CN2010/080585
§ 371 (c)(1),
(2), (4) Date: Jan. 24, 2014

(87) PCT Pub. No.: WO2012/088708
PCT Pub. Date: Jul. 5, 2012

(65) Prior Publication Data
US 2014/0126869 A1     May 8, 2014

(51) Int. Cl.
G02B 6/00 (2006.01)
G02B 6/44 (2006.01)
G02B 6/46 (2006.01)

(52) U.S. Cl.
CPC ............ *G02B 6/4446* (2013.01); *G02B 6/4452* (2013.01); *G02B 6/46* (2013.01); *Y10T 29/49826* (2015.01)

(58) Field of Classification Search
CPC ....................................... G02B 6/4446–6/4452
See application file for complete search history.

(56) References Cited

U.S. PATENT DOCUMENTS

| 5,511,144 A | 4/1996 | Hawkins et al. |
| 6,912,349 B2 * | 6/2005 | Clark et al. .................. 385/134 |
| 7,546,018 B2 | 6/2009 | Hendrickson et al. |
| 2009/0060439 A1 | 3/2009 | Cox et al. |

FOREIGN PATENT DOCUMENTS

| JP | 2001-124936 | 5/2001 |
| JP | 2001-242323 | 9/2001 |
| JP | 2002-258062 | 9/2002 |
| JP | 2005-70578 | 3/2005 |
| JP | 2007-192935 | 8/2007 |

OTHER PUBLICATIONS

International Search Report for International Application No. PCT/CN2010/080585 mailed Oct. 20, 2011 (2 pages). 23552 Patent Trademark Office.

* cited by examiner

*Primary Examiner* — Omar R Rojas
(74) *Attorney, Agent, or Firm* — Merchant & Gould P.C.

(57) ABSTRACT

A fiber optic enclosure assembly includes a fiber optic enclosure and a cable shroud assembly. The fiber optic enclosure includes a base having a first end, an oppositely disposed second end, and first and second sides that extend between the first and second ends. A cover is engaged to the base. The cable shroud assembly includes a first piece engaged to the first and second sides of the base of the fiber optic enclosure at the first end of the base. The first piece includes a base wall, a first side wall that extends outwardly from the base wall and an oppositely disposed second side wall. The first piece includes a plurality of cable management spools disposed on the base wall. A second piece is engaged to the first piece. The second piece is configured to cover cables that enter/exit the first end of the base.

20 Claims, 14 Drawing Sheets

CABLE SHROUD ASSEMBLY FOR FIBER OPTIC ENCLOSURE

This application is a National Stage Application of PCT/CN2010/080585, filed 31 Dec. 2010 and which application is incorporated herein by reference. To the extent appropriate, a claim of priority is made to the above disclosed application.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub.

SUMMARY

An aspect of the present disclosure relates to a fiber optic enclosure assembly including a fiber optic enclosure and a cable shroud assembly engaged to the fiber optic enclosure. The fiber optic enclosure is adapted to hold telecommunications components and includes a base having a first end, an oppositely disposed second end, a first side that extends between the first and second ends, and an oppositely disposed second side that extends between the first and second ends. A cover is engaged to the base. The cable shroud assembly includes a first piece engaged to the first and second sides of the base of the fiber optic enclosure at the first end of the base. The first piece includes a base wall, a first side wall that extends outwardly from the base wall and an oppositely disposed second side wall. The first piece includes a plurality of cable management spools disposed on the base wall. A second piece is engaged to the first piece. The second piece is configured to cover cables that enter/exit the first end of the base.

Another aspect of the present disclosure relates to a fiber optic enclosure assembly including a fiber optic enclosure and a cable shroud assembly engaged to the fiber optic enclosure. The fiber optic enclosure is adapted to hold telecommunications components and includes a base having a first end, an oppositely disposed second end, a first side that extends between the first and second ends, and an oppositely disposed second side that extends between the first and second ends. The first side includes a first rail that extends outwardly from the first side. The second side includes a second rail that extends outwardly from the second side. A cover is engaged to the base. The cable shroud assembly includes a first piece engaged to the first and second sides of the base of the fiber optic enclosure at the first end of the base. The first piece includes a base wall, a first side wall that extends outwardly from the base wall and an oppositely disposed second side wall. The first side wall defines a first channel that is adapted to receive the first rail of the base. The second side wall defines a second channel that is adapted to receive the second rail of the base. The first piece includes a plurality of cable management spools disposed on the base wall. A second piece is engaged to the first piece. The second piece is configured to cover cables that enter/exit the first end of the base.

Another aspect of the present disclosure relates to a method of installing a cable shroud assembly to a fiber optic enclosure. The method includes inserting a first rail disposed on a first side of a base of a fiber optic enclosure and a second rail disposed on a second side of the base into first and second channels, respectively, of a first piece of a cable shroud assembly. The fiber optic enclosure is adapted to house telecommunications components. A fiber optic cable that enters the fiber optic enclosure is routed around cable management spools of the first piece. A second piece of the cable shroud assembly is engaged to the first piece.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
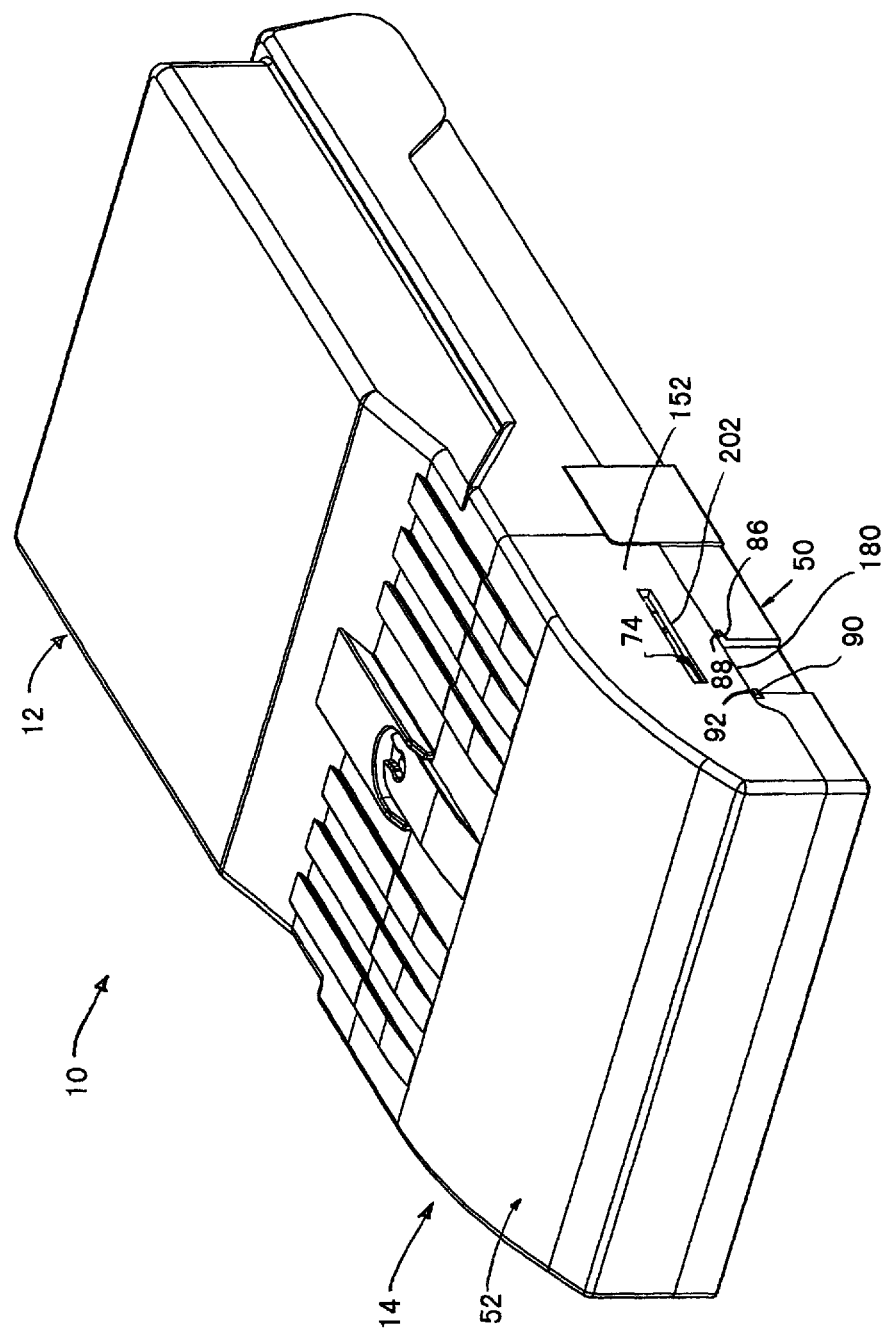
FIG. 1 is an isometric view of a fiber optic enclosure assembly having exemplary features of aspects in accordance with the principles of the present disclosure.

Referring now to FIG. 1, a fiber optic enclosure assembly 10 is shown. The fiber optic enclosure assembly 10 includes a fiber optic enclosure 12 and a cable shroud assembly 14.

The fiber optic enclosure assembly 10 serves as a location at which an incoming fiber optic cable (e.g., a feeder cable) is terminated to outgoing optical fibers (e.g., distribution cables). The cable shroud assembly 14 is adapted to enclose a portion of the incoming fiber optic cable outside of the fiber optic enclosure 12 as that cable is routed to the fiber optic enclosure 12. The cable shroud assembly 14 includes cable management features that allow slack lengths of the incoming fiber optic cable to be stored outside the fiber optic enclosure 12 within the cable shroud 14. The cable shroud assembly 14 is further adapted to enclose a portion of the outgoing optical fibers that exit the fiber optic enclosure 12. Slack lengths of the outgoing optical fibers can also be stored within the cable shroud 14.

Figure 2:
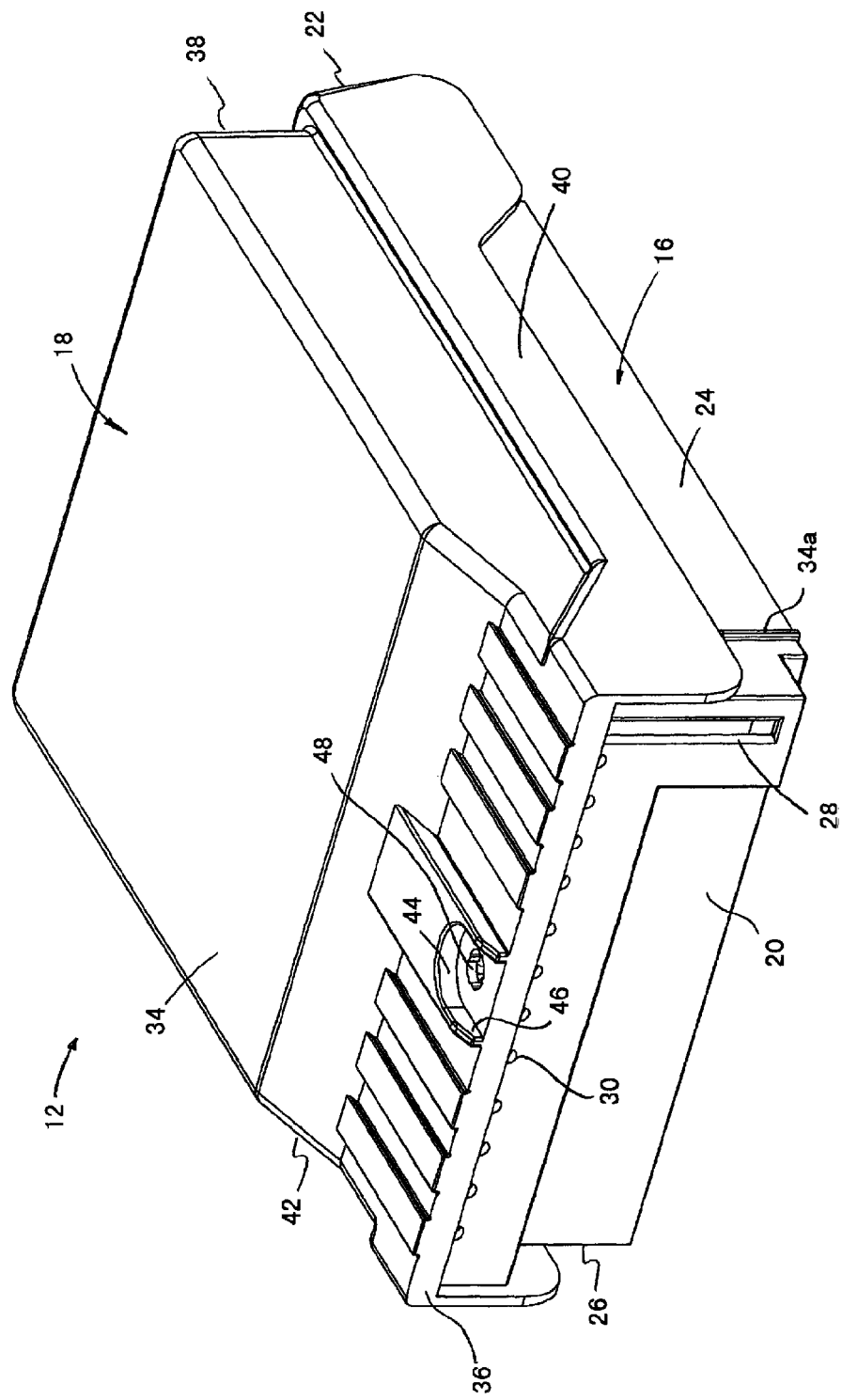
FIG. 2 is an isometric view of a fiber optic enclosure suitable for use with the fiber optic enclosure assembly of FIG. 1.
Figure 3:
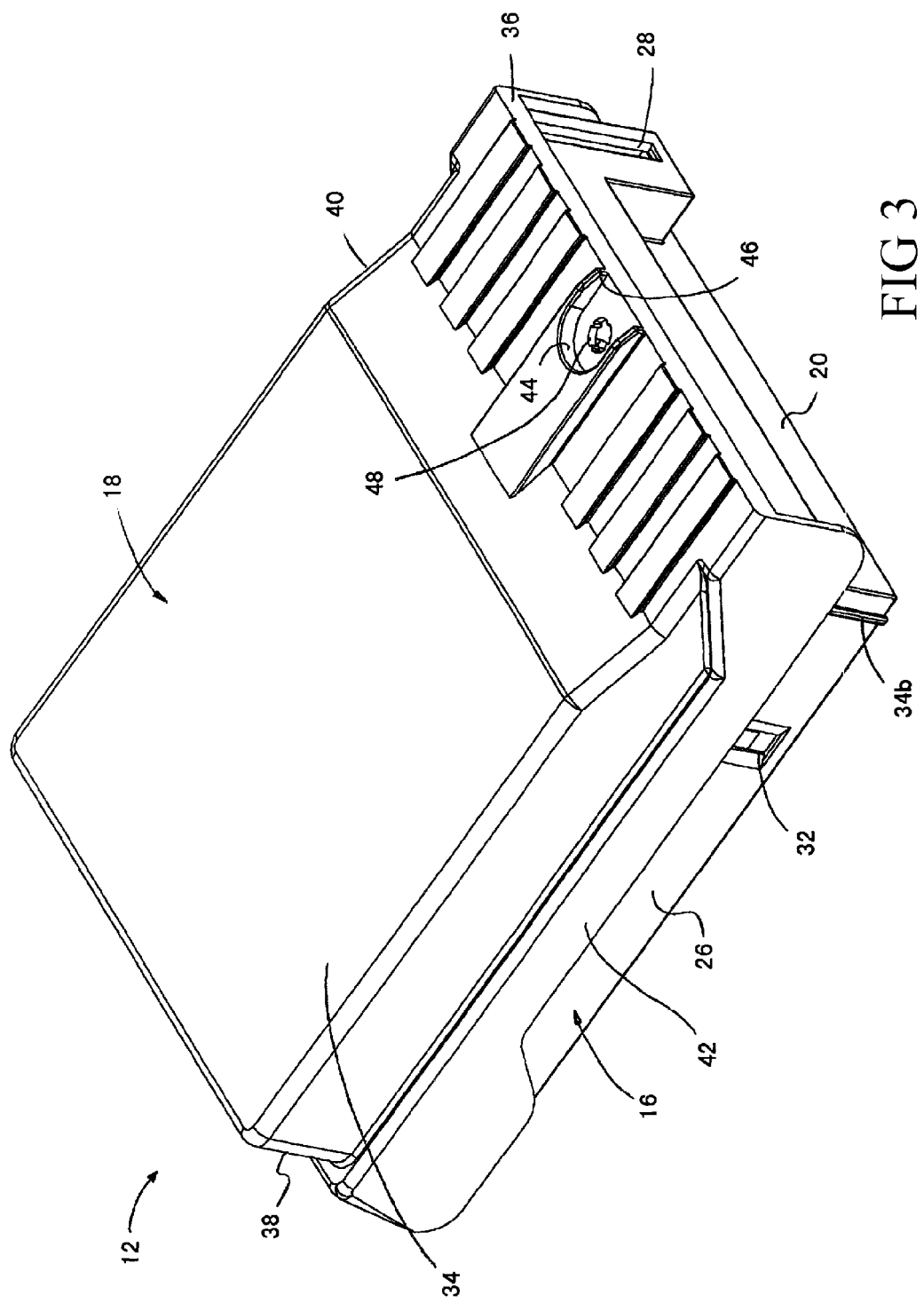
FIG. 3 is another isometric view of the fiber optic enclosure of FIG. 2.
Figure 4:
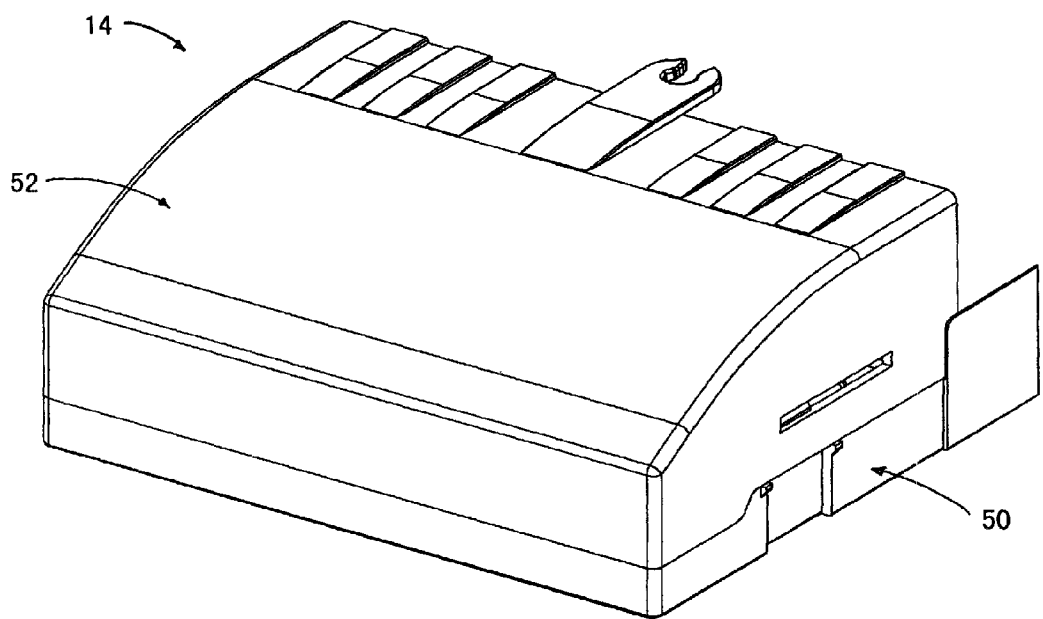
FIG. 4 is an isometric view of a cable shroud assembly suitable for use with the fiber optic enclosure assembly of FIG. 1.
Figure 5:
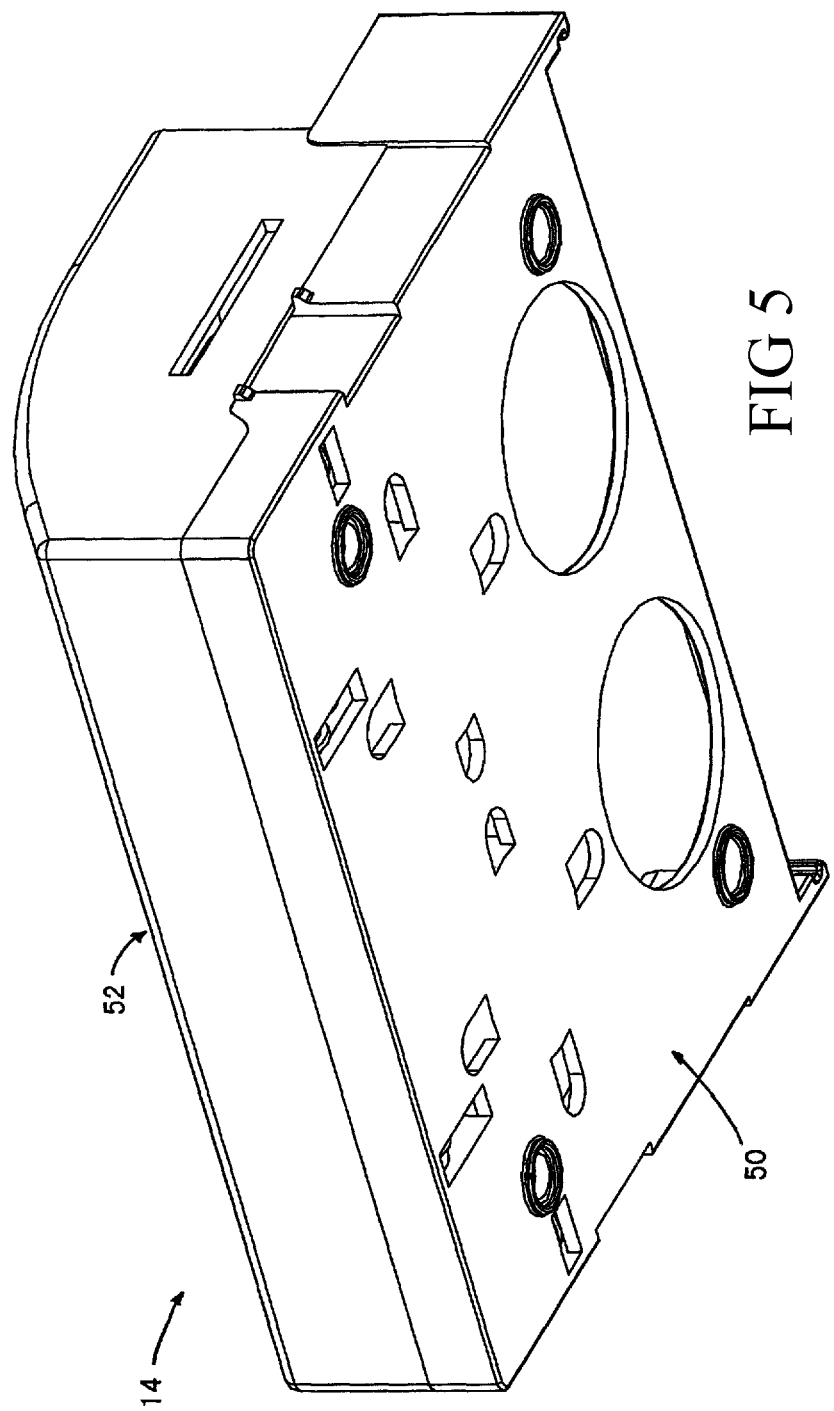
FIG. 5 is another isometric view of the cable shroud assembly of FIG. 4.
Figure 6:
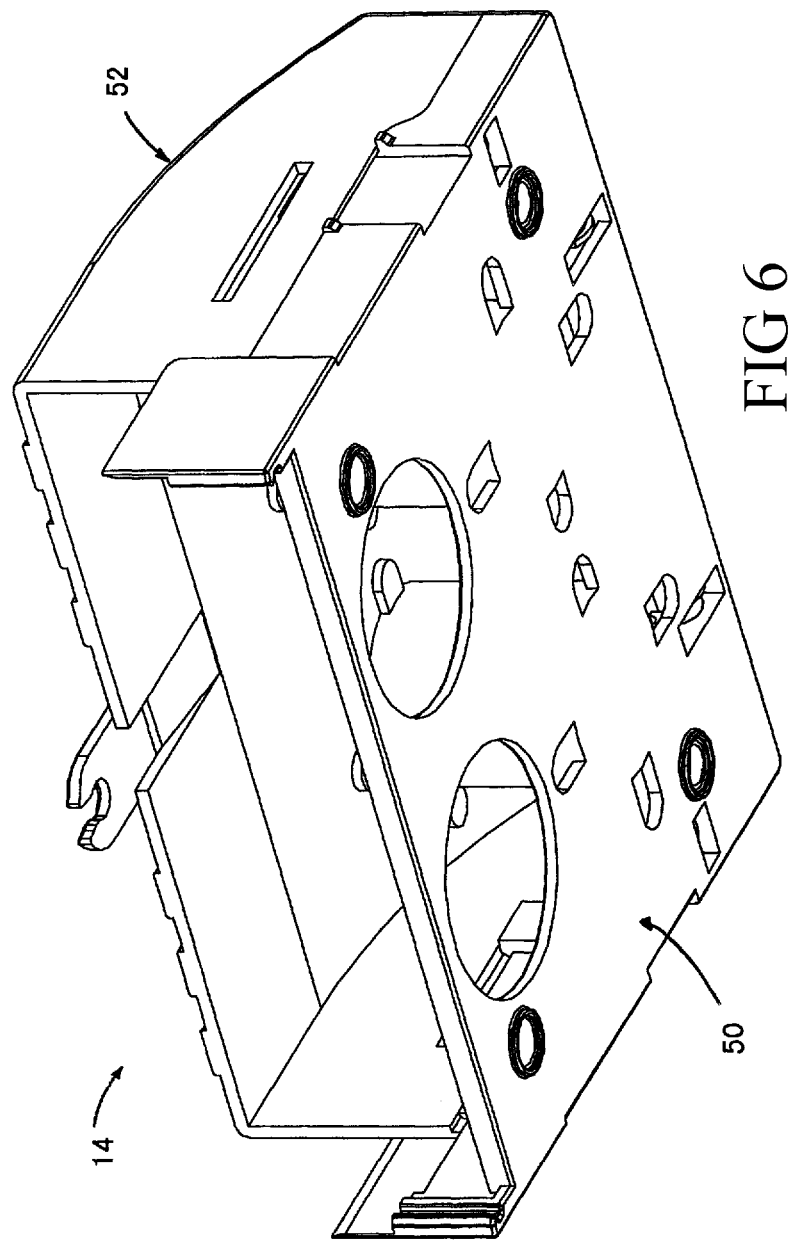
FIG. 6 is a rear isometric view of the cable shroud assembly of FIG. 4.
Figure 7:
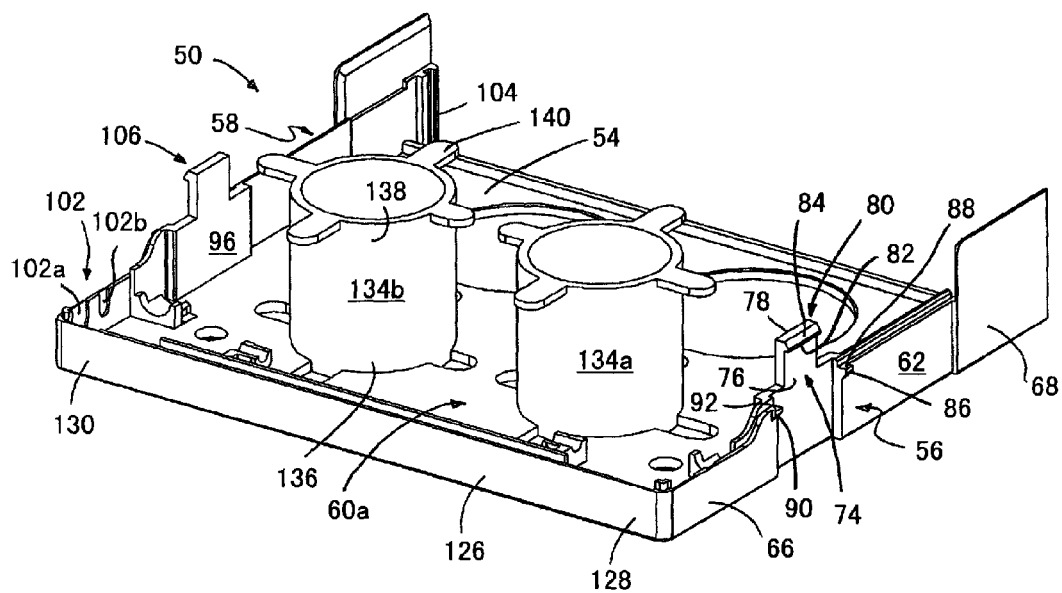
FIG. 7 is an isometric view of a first piece of the cable shroud assembly of FIG. 4.
Figure 8:
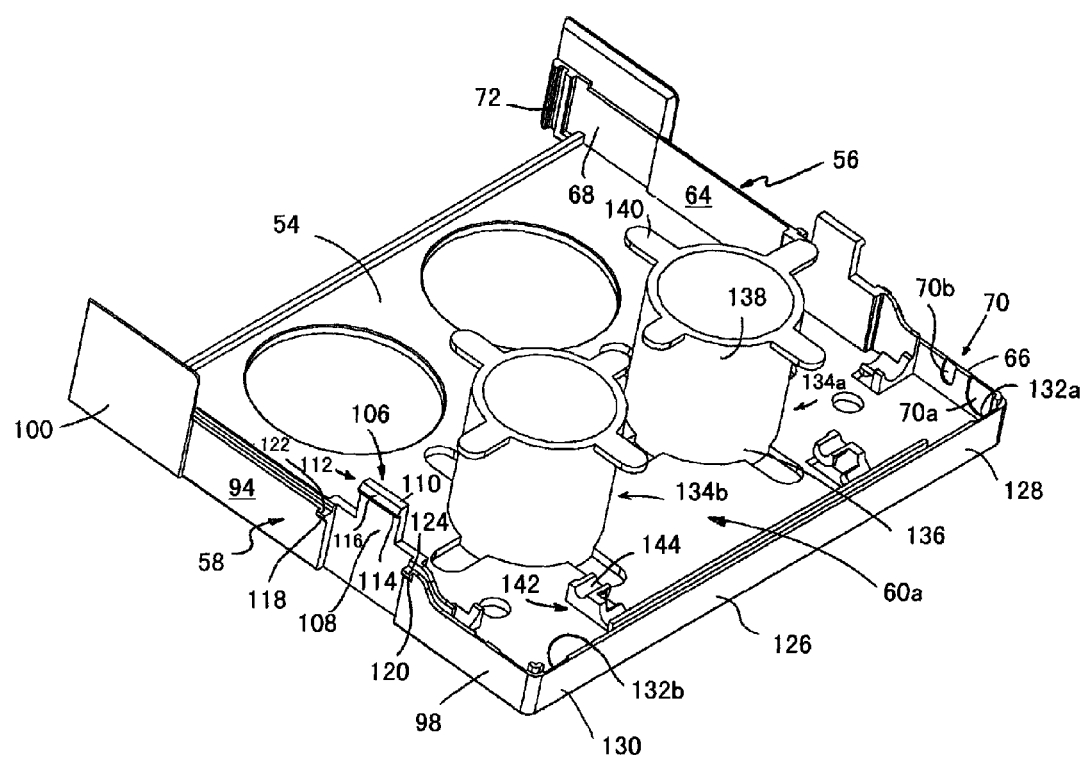
FIG. 8 is another isometric view of the first piece of FIG. 7.
Figure 9:
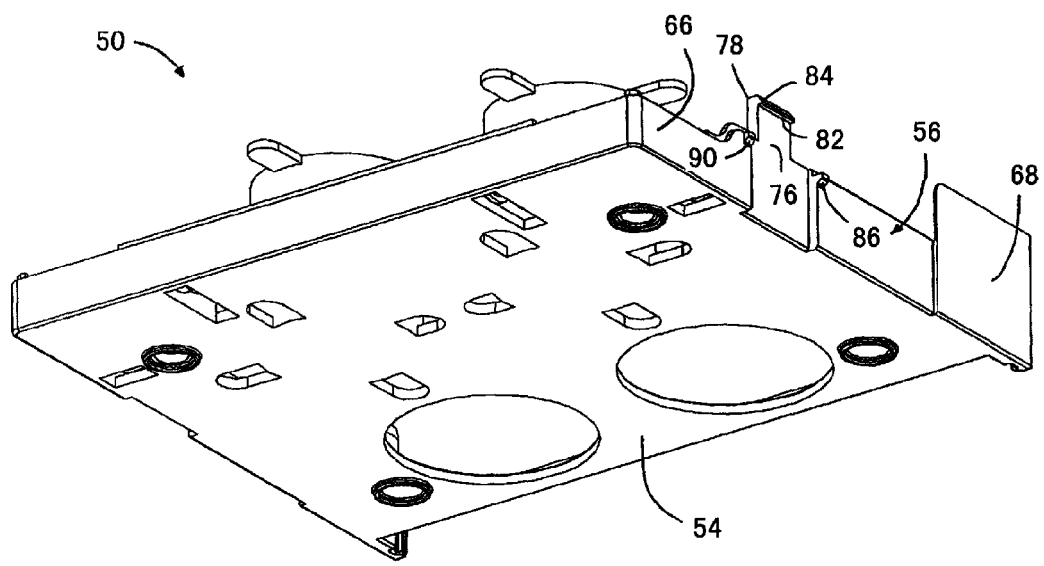
FIG. 9 is a bottom isometric view of the first piece of FIG. 7.
Figure 10:
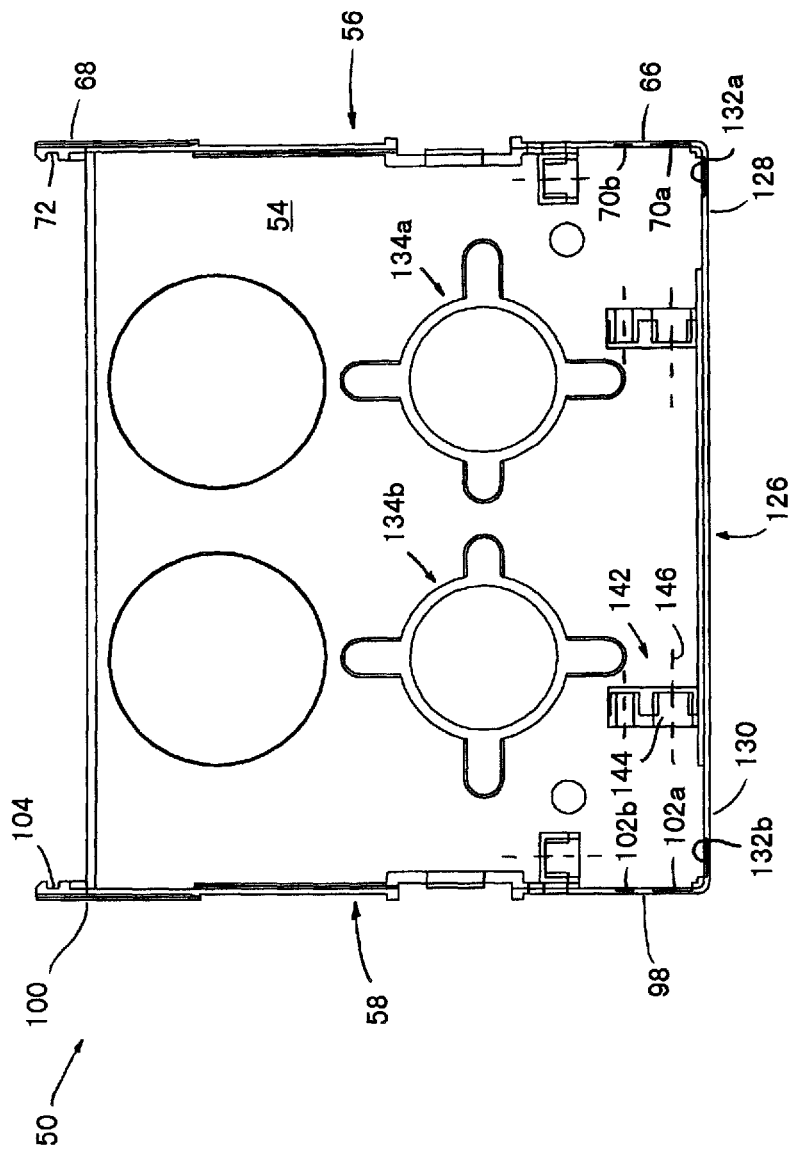
FIG. 10 is a top view of the first piece of FIG. 7.

Referring now to FIGS. 1-3, the fiber optic enclosure 12 is adapted to hold telecommunications components. The fiber optic enclosure 12 receives an incoming fiber optic cable. The fiber optic enclosure 12 is adapted to optically connect the incoming fiber optic cable to outgoing optical fibers.

In the depicted embodiment, the fiber optic enclosure 12 includes a base 16 and a cover 18. The base 16 and the cover 18 cooperatively define an interior region in which the telecommunication components are disposed.

The base 16 includes a first end 20, an oppositely disposed second end 22, a first side 24 that extends between the first and second ends 20, 22 and an oppositely disposed second side 26. The first end 20 defines a cable inlet 28 and a plurality of cable outlets 30. The cable inlet 28 and the plurality of cable outlets 30 provide access to the interior region of the fiber optic enclosure 12. In the depicted embodiment, the cable inlet 28 is a slot that extends in a generally vertical direction and defines an opening at an edge of the first end 20 so that the fiber optic cable can be inserted laterally into the cable inlet 28. The plurality of cable outlets 30 extend along the first end 20 and defines a plurality of openings at the edge of the first end 20 so that the optical fibers can be inserted laterally into the cable outlets 30.

The second side 26 of the base 16 defines a cable opening 32. The cable opening 32 provides an alternate location at which the fiber optic cable or the optical fibers can enter/exit the fiber optic enclosure 12.

The base 16 further includes a first rail 34a and a second rail 34b. The first rail 34a is a projection that extends outwardly from the first side 24 of the base 16. The first rail 34a is disposed adjacent to the first end 20. The second rail 34b is a projection that extends outwardly from the second side 26 of the base 16. The second rail 34b is disposed adjacent to the first end 20. In the depicted embodiment, the second rail 34b is disposed between the first end 20 and the cable opening 32.

The cover 18 includes a cover panel 34 having an open end 36 and an oppositely disposed closed end 38. The cover 18 further includes a first sidewall 40 that extends outwardly from the cover panel 34 and an oppositely disposed second sidewall 42. The cover 18 is pivotally engaged to the base 16 so that the cover can pivot between a closed position (shown in FIGS. 2 and 3) and an open position. In the depicted embodiment, the first and second sidewalls 40, 42 of the cover 18 are engaged to the first and second sides 24, 26 of the base 16, respectively, near the second end 22 of the base 16. With the cover 18 in the closed position, the open end 36 provides access to the cable inlet 28 and the plurality of cable outlets 30 of the base 16.

The cover panel 34 of the cover 18 defines a recess 44. The recess 44 further defines an opening 48 that extends through the cover panel 34. The opening 48 of the cover 18 is adapted to receive a fastener (e.g., lock, bolt, screw, etc.) to secure the cover 18 to the base 16.

Referring now to FIGS. 1 and 4-6, the cable shroud assembly 14 is shown. The cable shroud assembly 14 is adapted to manage the fiber optic cable and the optical fibers as the fiber optic cable and optical fibers enter/exit the fiber optic enclosure 12.

The cable shroud assembly 14 includes a first piece 50 and a second piece 52. In the depicted embodiment, the first piece 50 is a base piece and the second piece 52 is a cover piece.

Referring now to FIGS. 7-10, the first piece 50 is shown. The first piece 50 includes a base wall 54, a first side wall 56 that extends outwardly from the base wall 54 and an oppositely disposed second side wall 58 that extends outwardly from the base wall 54. The base wall 54, first and second side walls 56, 58 cooperatively define an interior 60a of the first piece 50.

The first side wall 56 includes an outer surface 62 and an oppositely disposed inner surface 64. The first side wall 56 further includes a first end portion 66 and an oppositely disposed second end portion 68.

In the depicted embodiment, the first end portion 66 includes a first plurality of punch-outs 70. The first plurality of punch-outs 70 is an area of weakness that can be removed to provide access to the interior 60a of the first piece 50. In the depicted embodiment, the punch-outs 70 are recesses disposed in the inner surface 64 of the first end portion 66 of the first piece 50. The first plurality of punch-outs 70 includes a first punch-out 70a and a second punch-out 70b. The first punch-out 70a has an area that is greater than an area of the second punch-out 70b so that the first punch-out 70a can receive a cable having a greater cross-sectional area.

The second end portion 68 of the first side wall 56 defines a first channel 72. The first channel 72 is adapted to receive the first rail 34a of the base 16 of the fiber optic enclosure 12. In the depicted embodiment, the first channel 72 extends in a direction that is generally perpendicular to the base wall 54 of the first piece 50.

The first side wall 56 further includes a first resilient latch 74. The first resilient latch 74 includes a base end 76 and an oppositely disposed free end 78. The base end 76 is integrally connected to the first side wall 56. The free end 78 extends outwardly from the first side wall 56 in a direction that is generally perpendicular to the base wall 54. The free end 78 includes a latch portion 80 having a lip 82 that extends outwardly from the first side wall 56 in a direction that is generally perpendicular to the first side wall 56 and an angled surface 84. In the depicted embodiment, the latch portion 80 of the first resilient latch 74 has a width W1. In the depicted embodiment, the first resilient latch 74 is disposed between the first and second end portions 66, 68.

The first side wall 56 further includes a first support 86. The first support 86 is a protrusion that extends outwardly from the outer surface 62 of the first side wall 56 and is adapted to provide some support to the second piece 52 when the second piece 52 is engaged to the first piece 50. The first support 86 is disposed between the first resilient latch 74 and the second end portion 68 of the first side wall 56. In the depicted embodiment, the first support 86 includes a support surface 88.

In the depicted embodiment, the first side wall 56 includes a second support 90. The second support 90 extends outwardly from the outer surface 62 of the first side wall 56. The second support 90 is disposed between the resilient latch 74 and the first end portion 66 of the first side wall 56. The second support 90 includes a support surface 92.

The second side wall 58 includes an outer surface 94 and an oppositely disposed inner surface 96. The second side wall 58 further includes a first end portion 98 and an oppositely disposed second end portion 100.

In the depicted embodiment, the first end portion 98 includes a second plurality of punch-outs 102. The second plurality of punch-outs 102 is an area of weakness that can be removed to provide access to the interior 60a of the first piece 50. In the depicted embodiment, the punch-outs 102 are recesses disposed in the inner surface 96 of the first end portion 98 of the first piece 50. The second plurality of punch-outs 102 includes a first punch-out 102a and a second punch-out 102b where the first punch-out 102a has an area that is greater than an area of the second punch-out 102b.

The second end portion 100 of the second side wall 58 defines a second channel 104. The second channel 104 is adapted to receive the second rail 34b of the base 16 of the fiber optic enclosure 12. In the depicted embodiment, the second channel 104 extends in a direction that is generally perpendicular to the base wall 54 of the first piece 50.

The second side wall 58 further includes a second resilient latch 106. The second resilient latch 106 includes a base end 108 and an oppositely disposed free end 110. The base end 108 is integrally connected to the second side wall 58. The free end 110 extends outwardly from the second side wall 58 in a direction that is generally perpendicular to the base wall 54. The free end 110 includes a latch portion 112 having a lip 114 that extends outwardly from the second side wall 58 in a direction that is generally perpendicular to the second side wall 58 and an angled surface 116. In the depicted embodiment, the latch portion 112 of the second resilient latch 106 has a width W2. In the depicted embodiment, the second resilient latch 106 is disposed between the first and second end portions 98, 100.

The second side wall 58 further includes a first support 118 and a second support 120. The first and second supports 118, 120 extend outwardly from the outer surface 94 of the second side wall 58. The first support 118 is disposed between the second resilient latch 106 and the second end portion 100 of the second side wall 58 while the second support 120 is disposed between the second resilient latch 106 and the first end portion 98. In the depicted embodiment, the first and second supports 118, 120 include support surfaces 122, 124, respectively.

The first piece 50 further includes an end wall 126 having a first axial end 128 and an oppositely disposed second axial end 130. The first axial end 128 is engaged to the first end portion 66 of the first side wall 56 while the second axial end 130 is engaged to the first end portion 98 of the second side wall 58. In the depicted embodiment, the end wall 126 includes a first punch-out 132a at the first axial end 128 and a second punch-out 132b at the second axial end 130.

The first piece 50 includes a plurality of cable management spools 134. In the depicted embodiment, the first piece 50 includes a first cable management spool 134a disposed adjacent to the first side wall 56 and a second cable management spool 134b disposed adjacent to the second side wall 58. Each of the first and second cable management spools 134a, 134b is generally cylindrical in shape and includes a radius that is greater than the minimum bend radius of the incoming and/or outgoing fiber optic cable. Each of the first and second cable management spools 134a, 134b includes a first axial end 136 that is connected to the base wall 54 and an oppositely disposed second axial end 138. In the depicted embodiment, a plurality of projections 140 extend radially outward from the second axial end of each of the first and second cable management spools 134a, 134b.

The first piece 50 further includes a plurality of cable guides 142. In the depicted embodiment, the first piece 50 includes four cable guides 142. Each of the cable guides 142 includes at least one channel 144 that is adapted to receive a fiber optic cable. In the depicted embodiment, the channel 144 is arcuate in shape and defines an axis 146. The axis 146 is generally aligned with one of the punch-outs 70a, 70b, 102a, 102b, 132a, 132b.

The first piece 50 defines a plurality of holes 148 that extend through the base wall 54. The holes 148 are disposed adjacent to the second end portions 68, 100 of the first and second side walls 56, 58. The holes 148 are adapted to a fiber optic cable that is inserted through the base wall 54.

Figure 11:
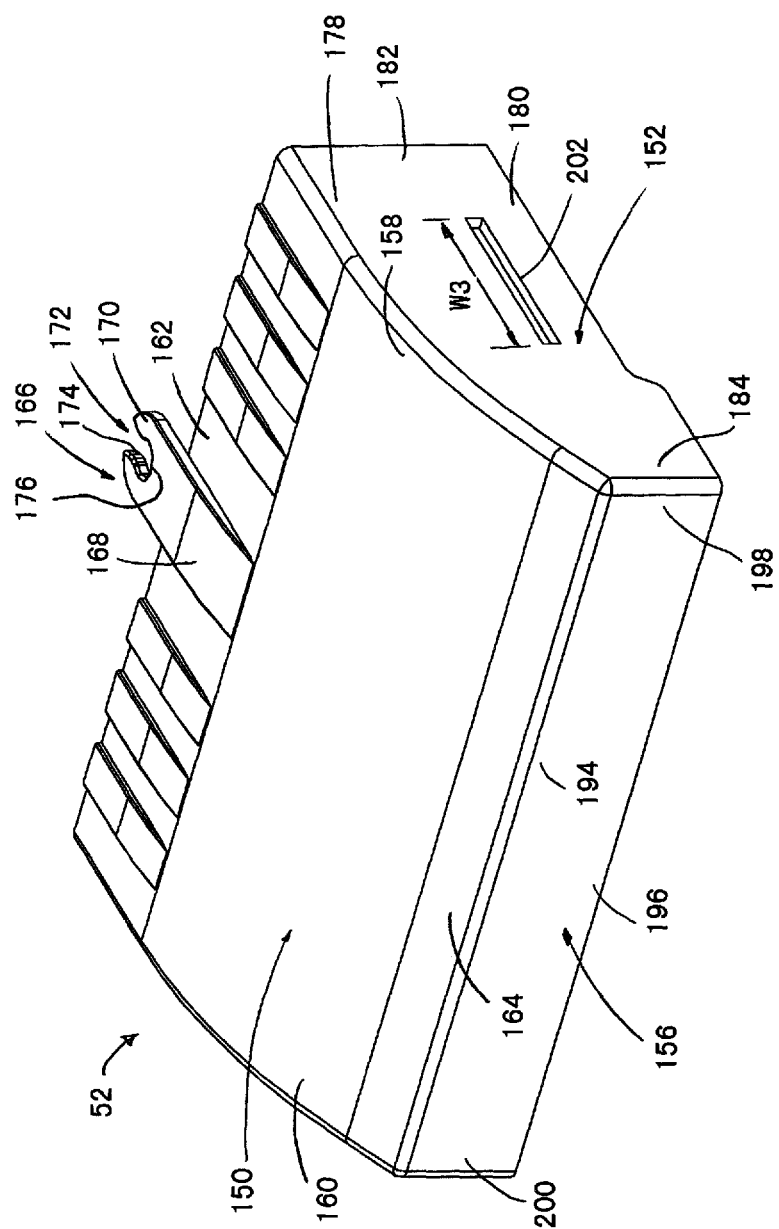
FIG. 11 is an isometric view of a second piece of the cable shroud assembly of FIG. 4.
Figure 12:
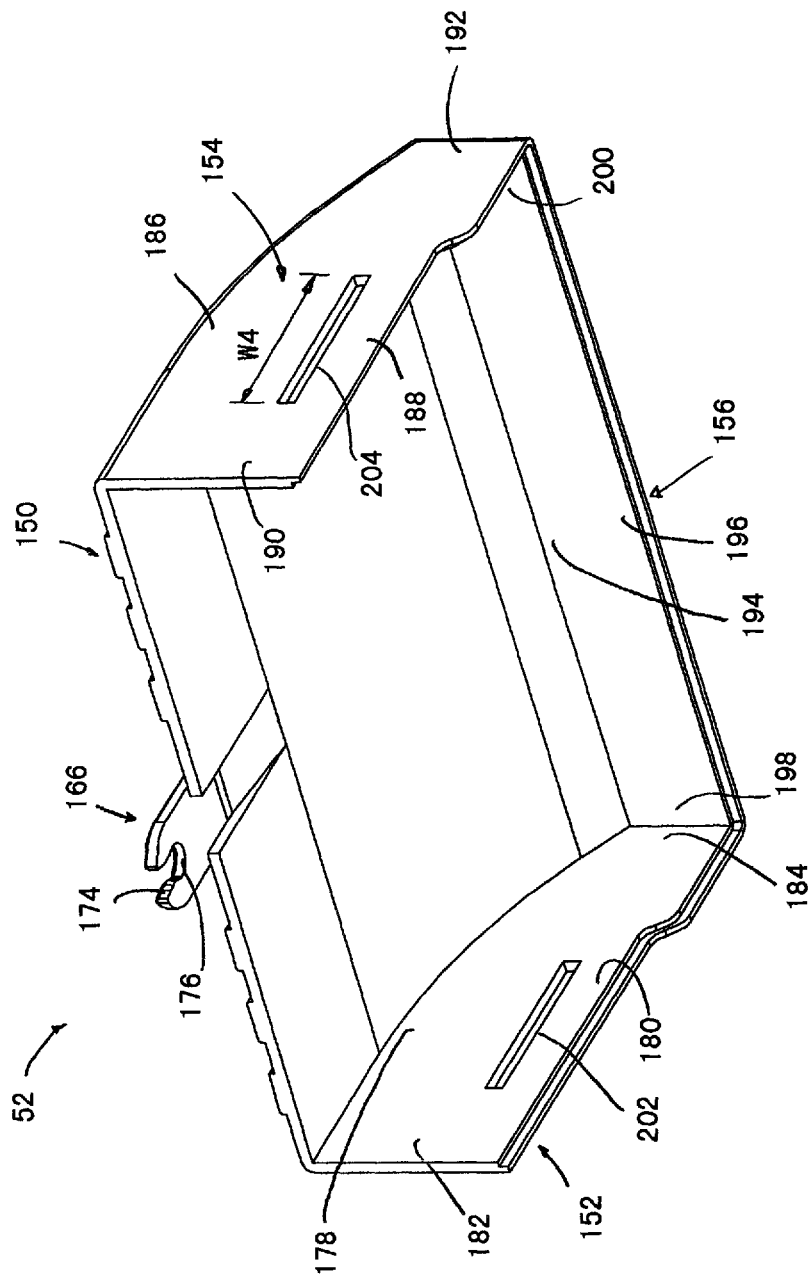
FIG. 12 is another isometric view of the second piece of FIG. 11.
Figure 13:
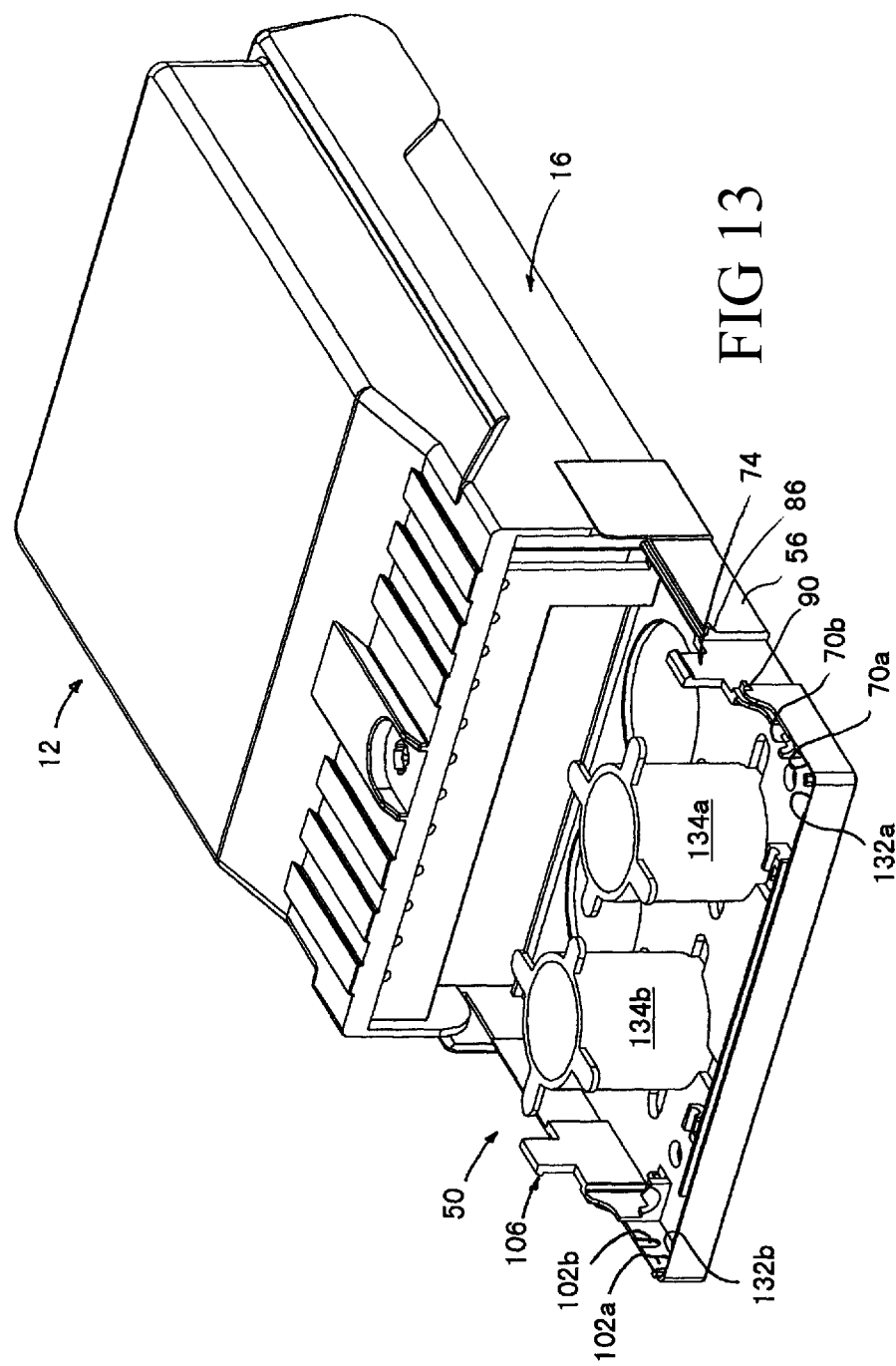
FIG. 13 is an isometric view of the first piece of the cable shroud assembly engaged to the fiber optic enclosure.
Figure 14:
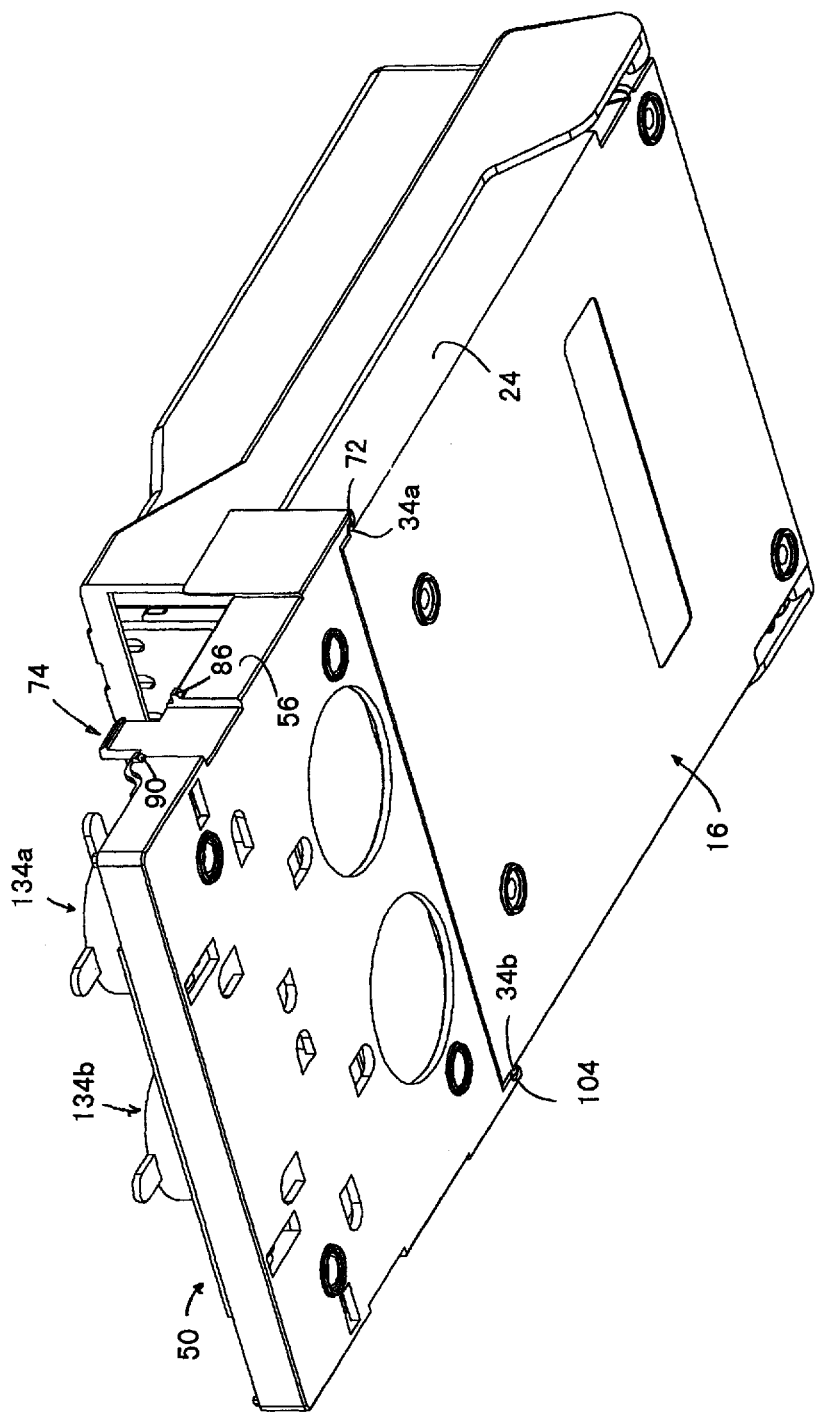
FIG. 14 is another isometric view of the first piece of the cable shroud assembly engaged to the fiber optic enclosure.

Referring now to FIGS. 11 and 12, the second piece 52 is shown. The second piece 52 includes a cover panel 150, a first side 152 that extends outwardly from the cover panel 150, an oppositely disposed second side 154 that extends outwardly from the cover panel 150 and an end wall 156 that extends between the first and second sides 152, 154.

The cover panel 150 includes a first side portion 158, an oppositely disposed second side portion 160, a first end portion 162 that extends between the first and second side portions and an oppositely dispose second end portion 164. In the depicted embodiment, the cover panel 150 has a generally curved shape so that the second end portion 164 is vertically offset from the first end portion 162.

The cover panel 150 includes a tab 166 that projects outwardly from the first end portion 162. The tab 166 includes a first end 168 that is engaged to the first end portion 162 and a second end 170. In the depicted embodiment, the second end 170 is a bifurcated end that defines a tab slot 172. The tab slot 172 extends through the tab 166. In the depicted embodiment, the tab slot 172 includes an open end 174 at a perimeter of the tab 166 and an oppositely disposed closed end 176. In the depicted embodiment, the closed end 176 defines a diameter that is greater than a width of the open end 174. The tab 166 is adapted to be received in the recess 44 of the cover panel 38. When the tab 166 is disposed in the recess 44, the tab slot 172 is generally aligned with the opening 48 of the recess 44.

The first side 152 includes a first longitudinal end portion 178 disposed at the first side portion 158 of the cover panel 150 and an oppositely disposed second longitudinal end portion 180. The first side 152 and the cover panel 150 are integrally engaged. In the depicted embodiment, the first side 152 and the cover panel 150 are monolithic. The first side 152 further includes a first axial end 182 and an oppositely disposed second axial end 184.

The second side 154 includes a first longitudinal end portion 186 disposed at the second side portion 160 of the cover panel 150 and an oppositely disposed second longitudinal end portion 188. The second side 154 and the cover panel 150 are integrally engaged. In the depicted embodiment, the second side 154 and the cover panel 150 are monolithic. The second side 154 further includes a first axial end 190 and an oppositely disposed second axial end 192.

The end wall 156 includes a first longitudinal end portion 194 disposed at an interface with the cover panel 150 and an oppositely disposed second longitudinal end portion 196. The end wall 156 further includes a first axial end 198 and an oppositely disposed second axial end 200. In the depicted embodiment, the first axial end 198 of the end wall 156 is engaged to the second axial end 184 of the first side 152 and the second axial end 200 of the end wall 156 is engaged to the second axial end 192 of the second side 154.

The first side 152 defines a first slot 202 that is adapted to receive the lip 82 of the latch portion 80 of the first resilient latch 74. The first slot 202 extends through the first side 152. The first slot 202 is generally longitudinal in shape and extends in a direction from the first axial end 182 to the second axial end 184 of the first side 152. In the depicted embodiment, the first slot 202 extends a width W3 that is greater than the width W1 of the latch portion 80 of the first resilient latch 74. In one embodiment, the width W1 of the latch portion 80 of the first resilient latch 74 is less than or equal to about three quarters (75%) of the width W3 of the first slot 202. In another embodiment, the W1 of the latch portion 80 of the first resilient latch 74 is less than or equal to about half (50%) of the width W3 of the first slot 202. In another embodiment, the W1 of the latch portion 80 of the first resilient latch 74 is less than or equal to about a third (33.33%) of the width W3 of the first slot 202.

The second side 154 defines a second slot 204 that is adapted to receive the lip 114 of the latch portion 112 of the second resilient latch 106. The second slot 204 extends through the second side 154. The second slot 204 is generally longitudinal in shape and extends in a direction from the first axial end 198 to the second axial end 200 of the second side 154. In the depicted embodiment, the second slot 204 extends a width W4 that is greater than the width W2 of the latch portion 112 of the second resilient latch 106. In one embodiment, the width W2 of the latch portion 112 of the second resilient latch 106 is less than or equal to about three quarters (75%) of the width W4 of the second slot 204. In another embodiment, the W2 of the latch portion 112 of the second resilient latch 106 is less than or equal to about half (50%) of the width W4 of the second slot 204. In another embodiment, the W2 of the latch portion 112 of the second resilient latch 106 is less than or equal to about a third (33.33%) of the width W4 of the second slot 204.

The second piece 52 defines an edge recess 206. The edge recess 206 extends along the second longitudinal end portions 180, 188, 196 of the first and second sides 152, 154 and the end wall 156. The edge recess 206 is adapted to receive a portion of the first and second side walls 56, 58 and the end wall 126 of the first piece 50.

Referring now to FIGS. 1-14, the installation of the cable shroud assembly 14 to the fiber optic enclosure 12 will be described. The first piece 50 of the cable shroud assembly 14 is engaged to the base 16 of the fiber optic enclosure 12. In the depicted embodiment, the first and second rails 34a, 34b of the base 16 are inserted into the first and second channels 72, 104 of the first piece 50. The first piece 50 is then moved in a direction toward the base 16 so that the first and second rails 34a, 34b are fully engaged in the first and second channels 72, 104.

With the first piece 50 engaged to the base 16, the fiber optic cable entering the fiber optic enclosure is routed to an opening created by the removal of a corresponding punch-out 70a, 70b, 102a, 102b, 132a, 132b. Slack fiber optic cable is stored around the cable management spools 134a, 134b.

With the first piece 50 engaged to the base 16, the first and second slots 202, 204 of the second piece 52 are aligned with the first and second resilient latches 74, 106 of the first piece 52. The second piece 52 is engaged to the first piece 50. In the depicted embodiment, the second piece 52 is engaged to the first piece 50 by pressing the second piece in a direction toward the first piece 50 until the first and second resilient latches 74, 106 engage the first and second slots 202, 204. With the first and second resilient latches 74, 106 engaged in the first and second slots 202, 204, a portion of the second longitudinal end portion 180 of the first side 152 of the second piece 52 abuts the support surfaces 88, 92 of the first and second supports 86, 90 disposed on the first side wall 56 of the first piece 50 and a portion of the second longitudinal end portion 188 of the second side 154 of the second piece 52 abuts the support surfaces 122, 124 of the first and second supports 118, 120 disposed on the second side wall 58 of the first piece 50.

As the widths of the first and second slots 202, 204 are greater than the widths of the first and second resilient latches 74, 106, the second piece 52 can be moved relative to the first piece 50 when the first and second resilient latches 74, 106 are disposed in the first and second slots 202, 204. In one embodiment, the second piece 52 is offset from the first piece 50 when the first and second pieces 50, 52 are engaged so that the tab 166 of the second piece 52 is not disposed in the recess 44 of the fiber optic enclosure 12. After the first and second pieces 50, 52 are engaged, the second piece 52 is moved relative to the first piece 50 so that the tab 166 enters the recess 44. In another embodiment, the second piece 52 is aligned with the first piece 50 so that when the first and second pieces 50, 52 are engaged, the tab 166 is disposed in the recess 44.

With the second piece 52 engaged to the first piece 50, a fastener is inserted into the opening 48 of the recess 44 to secure the cover 18 to the base 16. The fastener is also inserted into the tab slot 172 to secure the second piece 52 to the fiber optic enclosure 12.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic enclosure assembly comprising:
    a fiber optic enclosure adapted to hold telecommunications components, the fiber optic enclosure including:
        a base having a first end, an oppositely disposed second end, a first side that extends between the first and second ends, and an oppositely disposed second side that extends between the first and second ends;
        a cover engaged to the base;
    a cable shroud assembly engaged to the fiber optic enclosure, the cable shroud assembly including:
        a first piece engaged to the first and second sides of the base of the fiber optic enclosure at the first end of the base, the first piece including a base wall, a first side wall that extends outwardly from the base wall, and an oppositely disposed second side wall, the first piece including a plurality of cable management spools disposed on the base wall; and
        a second piece engaged to the first piece, wherein the second piece is configured to cover cables that enter/exit the first end of the base.

2. The fiber optic enclosure assembly of claim 1, wherein the first piece includes a first resilient latch and the second piece includes a first slot that is adapted to receive the first resilient latch.

3. The fiber optic enclosure assembly of claim 2, wherein the first slot has a width that is greater than a width of the latch portion of the first resilient latch.

4. The fiber optic enclosure assembly of claim 1, wherein the first piece includes a first resilient latch disposed at the first side wall and a second resilient latch disposed at the second side wall.

5. The fiber optic enclosure assembly of claim 4, wherein the second piece defines a first slot adapted to receive the first resilient latch and a second slot adapted to receive the second resilient latch.

6. The fiber optic enclosure assembly of claim 5, wherein the first slot has a width that is greater than the width of a latch portion of the first resilient latch and the second slot has a width that is greater than the width of a latch portion of the second resilient latch.

7. The fiber optic enclosure assembly of claim 6, wherein the widths of the latch portions of the first and second resilient latches are less than or equal to about half of the widths of the first and second slots, respectively.

8. The fiber optic enclosure assembly of claim 4, wherein the first piece includes first and second supports disposed on the first side wall that are adapted to support a portion of the second piece, the first resilient latch being disposed between the first and second supports.

9. The fiber optic enclosure assembly of claim 1, wherein the first piece includes a punch-out that is configured for removal to provide access to an interior of the first piece.

10. The fiber optic enclosure assembly of claim 9, wherein the first piece defines a cable guide that is generally aligned with the punch-out.

11. The fiber optic enclosure assembly of claim 1, wherein the cover of the fiber optic enclosure defines a recess that is adapted to receive a fastener to secure the cover to the base.

12. The fiber optic enclosure assembly of claim 11, wherein the second piece includes a tab that extends outwardly from the second piece and is adapted for receipt in the recess of the fiber optic enclosure.

13. The fiber optic enclosure assembly of claim 1, wherein the first and second side walls of the first piece define first and second channels, respectively, that are adapted to receive first and second rails disposed on the base when the first piece is engaged to the base.

14. A fiber optic enclosure assembly comprising:
   a fiber optic enclosure adapted to hold telecommunications components, the fiber optic enclosure including:
      a base having a first end, an oppositely disposed second end, a first side that extends between the first and second ends, and an oppositely disposed second side that extends between the first and second ends, the first side including a first rail that extends outwardly from the first side, the second side including a second rail that extends outwardly from the second side;
      a cover engaged to the base;
   a cable shroud assembly engaged to the fiber optic enclosure, the cable shroud assembly including:
      a first piece engaged to the first and second sides of the base of the fiber optic enclosure at the first end of the base, the first piece including a base wall, a first side wall that extends outwardly from the base wall, and an oppositely disposed second side wall, the first side wall defining a first channel that is adapted to receive the first rail of the base, the second side wall defining a second channel that is adapted to receive the second rail of the base, the first piece including a plurality of cable management spools disposed on the base wall; and
      a second piece engaged to the first piece, wherein the second piece is configured to cover cables that enter/exit the first end of the base.

15. The fiber optic enclosure assembly of claim 14, wherein the first piece includes a first resilient latch disposed at the first side wall and a second resilient latch disposed at the second side wall.

16. The fiber optic enclosure assembly of claim 15, wherein the second piece defines a first slot adapted to receive the first resilient latch and a second slot adapted to receive the second resilient latch.

17. The fiber optic enclosure assembly of claim 15, wherein the first piece includes first and second supports disposed on the first side wall that are adapted to support a portion of the second piece, the first resilient latch being disposed between the first and second supports.

18. A method of installing a cable shroud assembly to a fiber optic enclosure, the method comprising:
   inserting a first rail disposed on a first side of a base of a fiber optic enclosure and a second rail disposed on a second side of the base into first and second channels, respectively, of a first piece of a cable shroud assembly, wherein the fiber optic enclosure is adapted to house telecommunication components;
   routing a fiber optic cable that enters the fiber optic enclosure around cable management spools of the first piece;
   engaging a second piece of the cable shroud assembly to the first piece.

19. The method of claim 18, wherein the second piece is engaged to the first piece by engaging first and second resilient latches of the first piece with first and second slots defined by the second piece.

20. The method of claim 19, wherein the second piece is moved in a direction toward the fiber optic enclosure when the first and second pieces are engaged.

* * * * *